Figure 7:
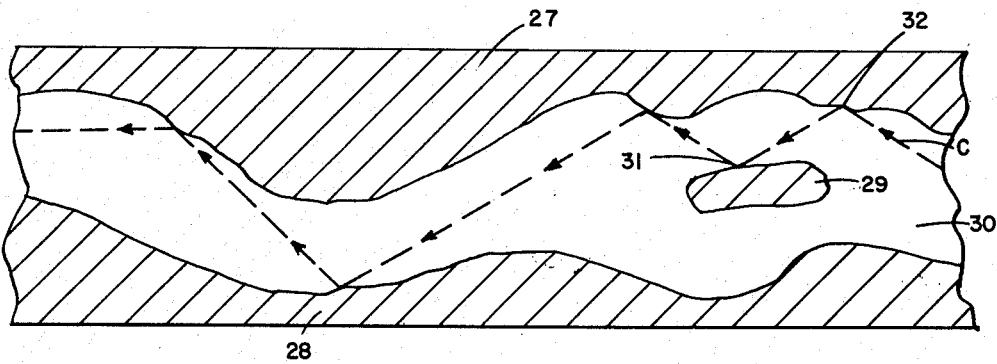

April 28, 1964 W. R. WIGGINS 3,130,803
TRACKING VEHICLE

Filed Nov. 3, 1961 4 Sheets-Sheet 1

INVENTOR.
WILLIAM R. WIGGINS
BY
ATTORNEY

*INVENTOR.*
WILLIAM R. WIGGINS
BY
ATTORNEY

April 28, 1964 W. R. WIGGINS 3,130,803
TRACKING VEHICLE

Filed Nov. 3, 1961 4 Sheets-Sheet 3

INVENTOR.
WILLIAM R. WIGGINS
BY
ATTORNEY

United States Patent Office 3,130,803
Patented Apr. 28, 1964

3,130,803
TRACKING VEHICLE
William R. Wiggins, 13024 S. Manhattan Place,
Gardena, Calif.
Filed Nov. 3, 1961, Ser. No. 150,069
12 Claims. (Cl. 180—6.5)

This invention pertains to a vehicle particularly adapted to follow a path defined by light and dark areas.

One use for the device of this invention is as a toy. There have been in the past various proposals for electrically driven toy vehicles operable to follow either a predetermined or random pattern. In general, however, any such toys capable of maneuvering have necessitated some sort of remote control means to effect stopping, starting or turning. Some have included cables by which appropriate signals are transmitted to the vehicle to cause it to perform as desired. Others have utilized radio-type transmitters for this purpose.

The device of this invention, however, operates on a new concept by which there is no direct remote control of the vehicle. Once started the vehicle will traverse a path of light and dark areas that may be defined on any surface. The patterns of this sort may be varied in almost any way, and the vehicle can be made to follow the path in a zigzag course, differing from time to time depending upon how the vehicle is started with respect to the pattern. Thus there is limitless variety in the manner in which the vehicle can be made to operate.

This result is accomplished by means of a battery powered vehicle having two drive motors. These are controlled by an electric circuit that includes two photosensitive devices of the type that change their resistance in accordance with the amount of light received. In darkness these cells impose an extremely high resistance, but when subjected to light they become excellent conductors. These photoconductors are disposed on opposite sides of the vehicle with a source of light located in between. The reflected light from the floor or other surface, therefore, governs the resistances of these two photosensitive devices. The photoconductor on the left-hand side of the vehicle controls the motor that drives right-hand wheels of the vehicle, and the photoconductor on the right side of the vehicle is located in the circuit for the left-hand drive motor. As a result, if a dark area is encountered on one side of the vehicle, the drive motor on the opposite side will stop or slow down, causing the other motor to swing the vehicle around till both photoconductors again receive reflected light. In one embodiment of the invention reversing motors are included which will cause the vehicle to move backwards in the event that both photoconductors are located over nonreflective areas.

Therefore, it is an object of this invention to provide a vehicle adapted to follow a pattern of light and dark areas.

Another object of this invention is to provide a vehicle operable without exterior control.

A further object of this invention is to provide a vehicle having a limitless number of possible operating paths.

Yet another object of this invention is to provide a vehicle having operating controls sensitive to light and dark areas encountered, and including a reversing provision to prevent the vehicle from becoming immobilized regardless of the contour of the pattern.

Figure 1:
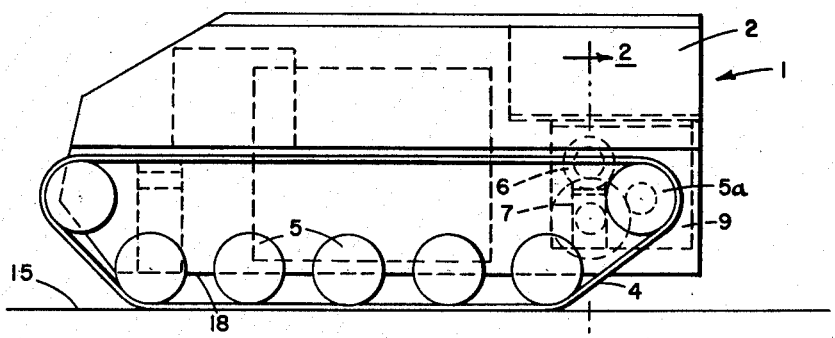
Figure 2:
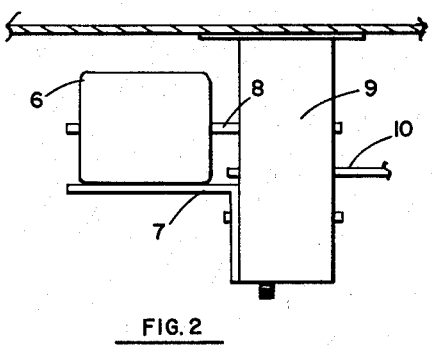
Figure 3:
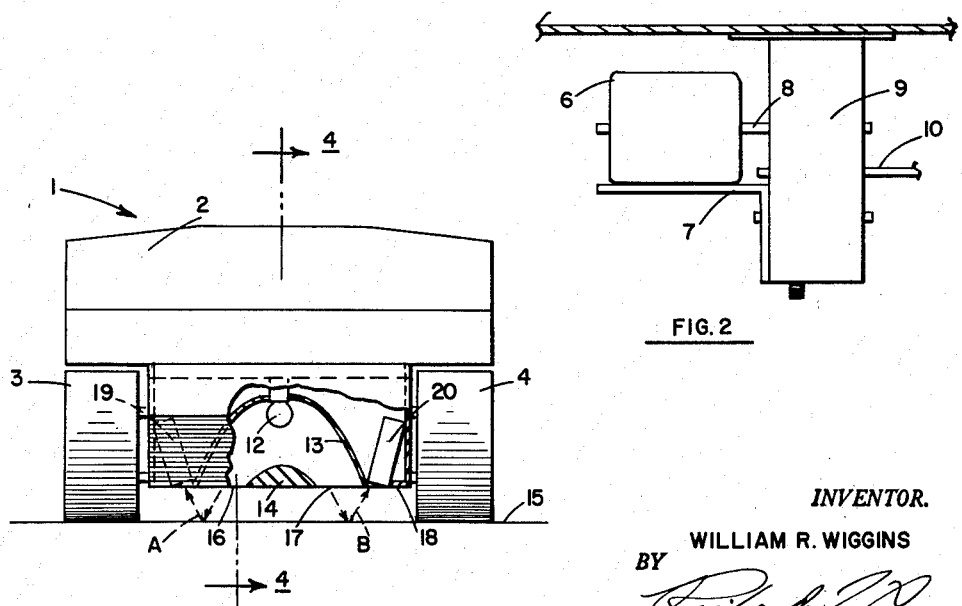
Figure 8:
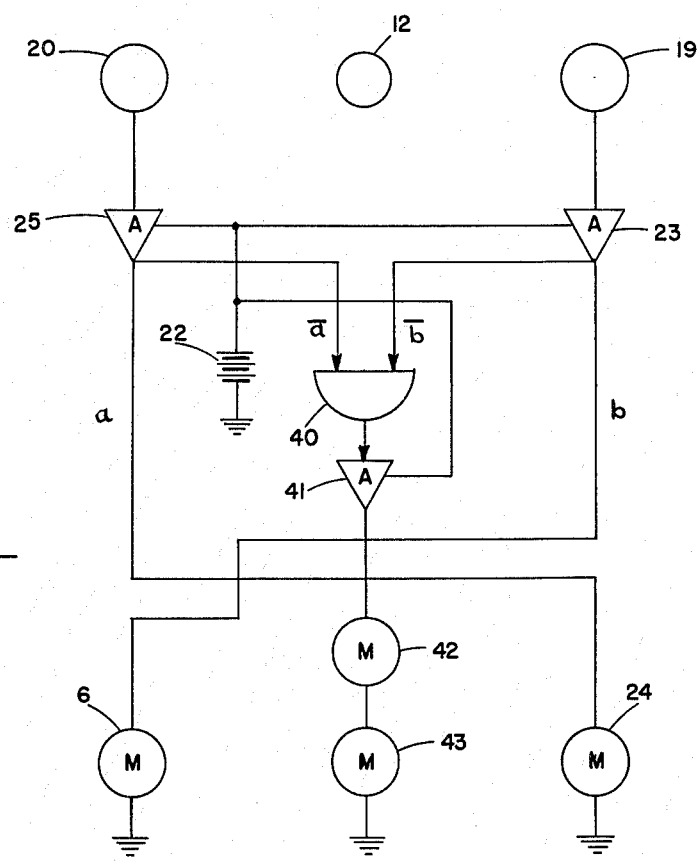
Figure 4:
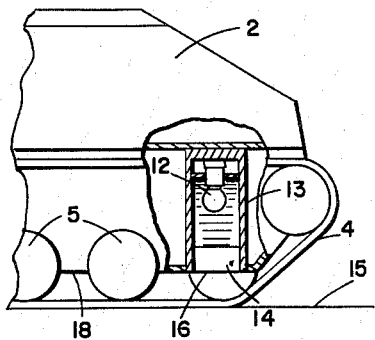
Figure 6:
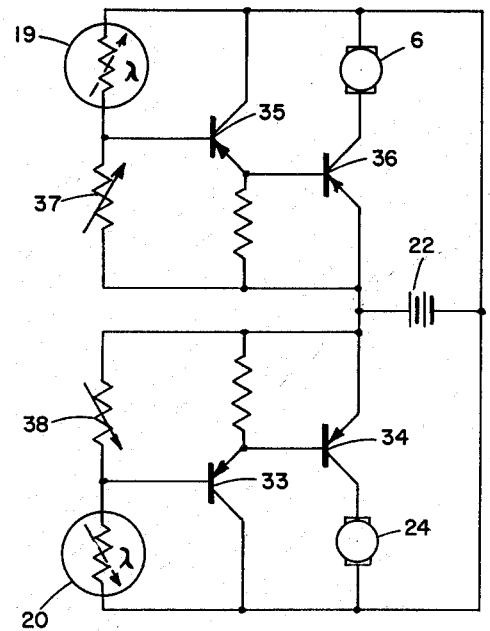
Figure 5:
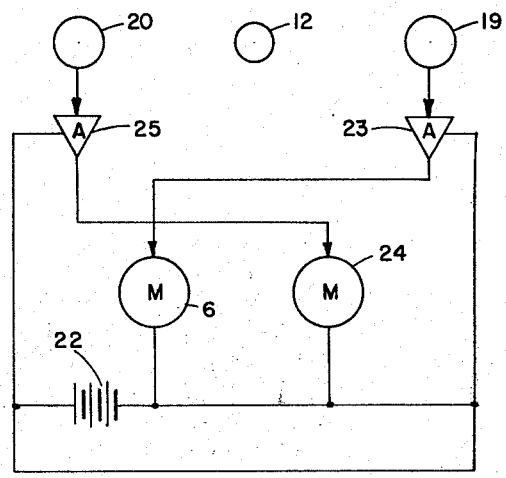
Figure 9:
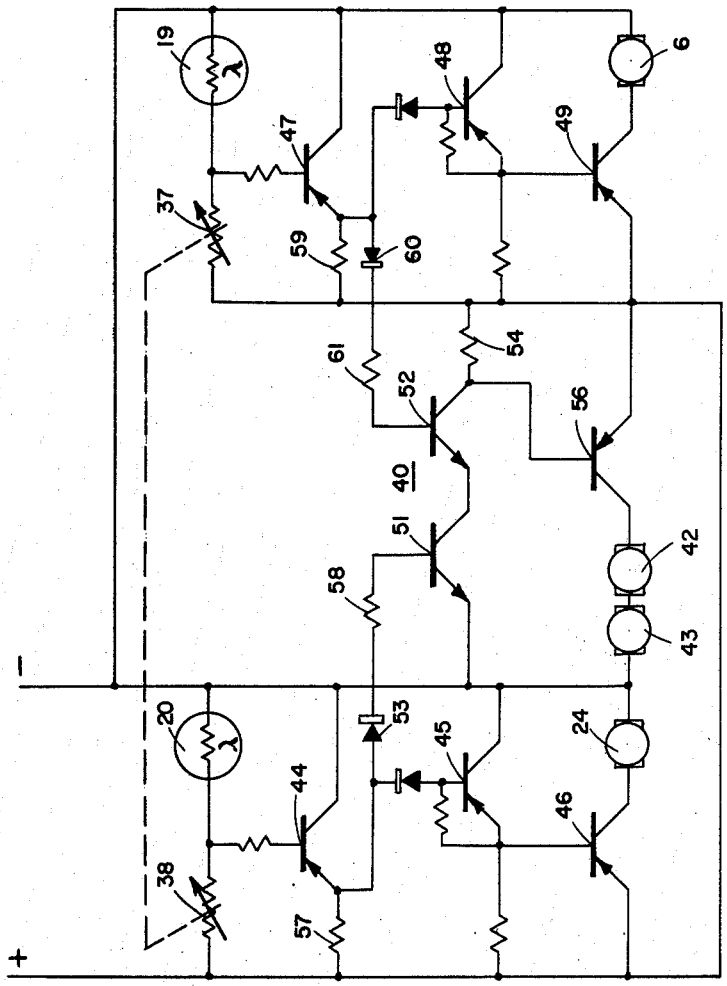

These and other objects will become apparent from the following detailed description taken in connection with the accompanying drawing in which:

FIG. 1 is a side elevational view of a vehicle embodying the teachings of this invention, FIG. 2 is a fragmentary transverse sectional view taken along line 2—2 of FIG. 1 showing the general arrangement of one of the drive motors, FIG. 3 is a front end elevational view of the device of FIG. 1, FIG. 4 is a fragmentary longitudinal sectional view taken along line 4—4 of FIG. 3 showing the arrangement for reflecting light to the photoconductive cells, FIG. 5 is a block diagram of the circuit for driving the vehicle, FIG. 6 is a schematic view of the details of the circuit of FIG. 5, FIG. 7 is a plan view of a typical pattern adapted to be traversed by the vehicle of this invention, illustrating a path of movement which the vehicle may follow, FIG. 8 is a block diagram of a circuit that includes a provision for reversing the vehicle in the event that both photoconductive cells encounter nonreflective areas, and FIG. 9 is a schematic view of the reversing circuit of FIG. 8.

With reference to FIGS. 1 through 4 of the drawing, the invention is illustrated as used in connection with a vehicle 1 shaped generally to represent a military tank. The particular form of the vehicle is unimportant, however, and it may provide a small scale reproduction of a train, truck or other vehicle as desired. In the embodiment illustrated, the vehicle 1 includes a body portion 2 having caterpillar type treads 3 and 4. The left-hand tread 4 is supported by, and engages the periphery of, a plurality of wheels 5. One of these, such as the rear wheel 5a, may provide the driving torque for moving the tread 4 about the wheels transmitting this force to the tread by friction or other suitable means. Similar wheels are disposed on the opposite side of the vehicle for the tread 3.

The interior of the housing 2 carries the batteries for powering the vehicle, as well as the associated circuitry, the drive motors and the necessary gearing. As seen in FIG. 2, for example, left-hand drive motor 6 is mounted within the housing on a suitable support 7 and includes a driveshaft 8 connecting to gear box 9. The latter unit accomplishes a suitable reduction so that its output shaft 10 rotates considerably slower than the motor shaft 8. Drive wheel 5a is connected to the shaft 10.

Located near the forward portion of the vehicle 1 is a light bulb 12 which may be disposed near the focal point of a parabolic reflector 13. Immediately below the light bulb 12 at the central axis of the vehicle is a baffle 14 to prevent light from the bulb from striking the surface 15 below the center of the vehicle. As a result, therefore, the light from the bulb 12 is directed by the reflector 13 and the baffle 14 through opertures 16 and 17 on either side of the vehicle's centerline. In the event that the surface 15 is reflective, this light will be reflected upwardly toward the undersurface 18 of the vehicle, as indicated by arrows A and B.

Located on either side of the reflector 13 are photosensitive devices 19 and 20 which are positioned so that they receive the reflected light rays A and B emanating from the bulb 12. The units 19 and 20 are semiconductors which may be photoconductive cells of selenium, for example, photodiodes also may be used. The photosensitive units 19 and 20 vary in resistance in accordance with the light incident on them. Thus when subjected to light, the cells 19 and 20 afford practically no resistance to the transmission of electric current. On the other hand, when these cells are in darkness, their resistance is extremely high, approximating an open circuit.

This construction is utilized in driving the vehicle 1 through the provision of the circuit shown in block form in FIG. 5. The left-hand drive motor 6 is connected in series with battery 22 and amplifier 23 which is controlled by photoconductor 19. Similarly, the circuit for the right-hand drive motor 24 includes a second amplifier 25 the conduction of which is governed by photoconductor 20.

As a result, when a light signal is received by both cells 19 and 20, neither will provide significant resistance to the flow of current from the battery 22. Therefore, both motors 6 and 24 will be operated for advancing the vehicle 1 over surface 15.

However, in the event that one of the cells 19 or 20 should receive only a small amount of light, its resistance immediately will increase. This will slow down or stop the motor in the circuit of that cell. Thus if light should fall on cell 20, but very little light be incident upon cell 19, the motor 6 will be stopped by virtue of the high resistance provided in its circuit, while motor 24 will continue to operate.

This arrangement can be used to drive the vehicle along a pattern of light and dark areas such as that illustrated in FIG. 7. This may have a random curved contour, as shown, with dark nonreflective segments 27, 28 and 29, resulting in a path 30 of light reflective nature. This permits the vehicle 1 to traverse a path such as indicated by the dotted line C. If the vehicle begins its movement from the right-hand portion of FIG. 7, the righthand forward portion of the vehicle will encounter the opaque area 27 at point 32. As a result, the right-hand photoconductor 19 will receive very little reflected light from the bulb 12. This will shut off drive motor 6 on the left-hand side of the vehicle. At the same time, however, the left-hand cell 20 will continue to receive reflected light from the area 30 so that the motor 24 will not cease its operation. The latter motor is located on the right-hand side of the vehicle causing the right-hand side to be driven as the left-hand portion is stopped, swinging the vehicle around so that it will change its direction. This movement proceeds until the right-hand cell 19 again receives reflected light from the area 30, at which time the vehicle proceeds under the power of both motors until it again strikes a nonreflective portion of the pattern. Hence, as the vehicle passes over the dark portion 29 of the pattern at point 31, left-hand photoconductor 20 will be cut off from its source of light thereby stopping the right-hand drive motor 24. The left-hand motor then pivots the vehicle around, bringing the left-hand cell 20 again over the reflective area 30. This movement takes place wherever the vehicle passes over nonreflective portions of the pattern permitting the vehicle to follow a line of direction such as indicated by the line C.

As a result, a random zigzag pattern of movement is followed. The exact path traversed depends not only upon the contour of the light and dark areas of the pattern, but also upon the direction of the vehicle as it is initially placed upon the pattern of the reflective and nonreflective portions. It can be seen, therefore, that the device of this invention provides a particularly intriguing toy by which the vehicle can be caused to follow a light and dark pattern, but in general an unpredictable path of movement. Any type of light and dark area may be provided for guiding the vehicle. It may be formed simply by imprinting black portions onto a strip of paper. The nonreflective areas may be drawn on with paint, chalk, or other means, and made up to suit the whimsy of the operator of the toy of this invention.

Where a constant curve is encountered, the vehicle will follow the line of curvature instead of pivoting away from it. This is because the photoconductor at the line between the light and dark surfaces will receive an intermediate intensity of reflected light due to the incidence of the light from the bulb 12 upon both light and dark areas at that side of the vehicle. This will increase the resistance of the photoconductor at that side of the vehicle, but not to the nearly infinite value that results when the side of the vehicle is entirely over a nonreflective surface. Hence, the motor controlled by that photoconductor will slow down because of the increased resistance in its circuit, but it will not stop. With a constant curve present the vehicle will not immediately leave the dark area when its direction is changed by the slowing of one motor, but will continue to receive a light signal of intermediate intensity. Therefore, the vehicle will move along the line of the curve as both motors operate, with one motor rotating slower than the other.

A transistorized motor drive circuit may be used to advantage for the vehicle of this invention, one embodiment being illustrated in FIG. 6. Thus, amplifier 25 can include transistors 33 and 34, while a complementary circuit having transistors 35 and 36 supplies the amplification in the circuit of the right-hand cell 19. Variable balancing resistors 37 and 38 also are included in the circuit. The power source is connected across the variable resistors and the cells to provide control voltages which can be varied in accordance with variation in resistances of the cells 19 and 20. The control voltages are used to control the amplifiers.

While photoconductive cells are preferred because of their cost, it is possible alternatively to utilize photovoltaic devices in controlling the vehicle. Photoelectric cells can be substituted in the circuit of FIG. 6 with their positions with respect to resistors 37 and 38 reversed from that of cells 19 and 20.

The invention as described above operates satisfactorily in most instances, providing the infinitely variable path of movement as discussed above. However, it has an inherent limitation in its inability to provide reverse movement of the vehicle. Therefore, if both of the photoconductive cells 19 and 20 are simultaneously over nonreflective areas, all drive power for the vehicle will be cut off and it will be immobilized. This condition can occur when the pattern causes the vehicle to attempt negotiation of a turn having a radius less than the minimum turn radius of the vehicle. It also may be encountered wherever the vehicle approaches a nonreflective area at an angle close to perpendicular.

This difficulty is obviated, however, by the use of the arrangement illustrated in FIGS. 8 and 9. By this modification, the vehicle is capable of reverse movement whenever the photoconductive cells simultaneously are cut off from light. The reverse movement is continued until at least one of the cells again is over a reflective area, at which time forward movement continues in the usual manner.

Referring now to FIG. 8, a block diagram illustrating how such reverse movement is accomplished is shown. As already indicated, when light is received by photoconductive cell 20, an output signal is fed to amplifier 25 which in turn provides an output signal to motor 24. Similarly, an output signal is fed from amplifier 23 to motor 6 when light is incident upon photoconductor 19. For the purpose of understanding the diagram of FIG. 8, the output signal from amplifier 25 may be designated as "$a$" and that of amplifier 23 as "$b$." "And" gate 40 is connected to both amplifiers 23 and 25. Utilizing the terminology of logical circuit design, the designations "$a$" and "$b$" indicate the presence of output signals from amplifiers 25 and 23, respectively, while "$\bar{a}$" and "$\bar{b}$" are used to represent the absence of output signals from these amplifiers. "And" gate 40 will feed an input signal to amplifier 41 only when $\bar{a}, \bar{b}$ conditions are satisfied, i.e., when there is no output signal on the line running from amplifier 25 to the gate, and there is no output signal on the line running from amplifier 23 to the gate. These conditions are only satisfied, of course, when light is neither impinging on photoconductive cell 19 nor photoconductive cell 20.

When "and" gate 40 is actuated, a drive signal is fed therefrom to amplifier 41 which in turn feeds current from power source 22 to reverse motors 42 and 43 which, as shown, are connected in series. Amplifier 41 is back biased so that it provides no output current to the reverse motors except when "and" gate 40 is actuated. Motor 42 is connected to the left-hand wheel drive, while motor 43 is connected to the right-hand drive.

Therefore, in the absence of light input signals to either photoconductive cell, the vehicle will back up until such time as a light signal is again received. At this time, with an "a" or a "b" signal present, "and" gate 40 will open, power to the reverse motors will be cut off, and normal forward drive will resume. The reversing control circuitry thus provides means for automatically returning the vehicle to a position where it can accomplish normal forward operation.

Referring now to FIG. 9, a schematic diagram can be seen, illustrating the details of an embodiment of the control circuitry of the device of the invention incorporating the reversing capability described in connection with FIG. 8. With light impinging on photoconductive cell 20, a drive signal is provided through cascaded transistor amplifier stages 44, 45 and 46 to provide a current flow from the power source plus terminal through transistor 46 to motor 24. Similarly, with light incident on photoconductive cell 19, a drive signal is provided through stages 47, 48 and 49 to provide power to motor 6. "And" gate 40 comprises transistor stages 51 and 52. With a light input signal to photoconductive cell 20, transistor 44 conducts. With transistor 44 conducting, the voltage at its emitter is substantially the same as that at its collector which is connected to the B— terminal. Diode 53 is therefore back biased and transistor 51 is kept at cut off. Similarly, transistor 52 is kept cut off when light signals are being received by photoconductive cell 19 and transistor 47 is conducting. Transistors 51 and 52 are connected in series between the B plus and B minus terminals of the power supply. Hence, to obtain conduction in these transistors, both must be simultaneously forward biased. The base of transistor 56 is connected to the common connection between resistor 54 and the collector of transistor 52. Transistor 56 is therefore back biased by the positive potential applied to its base through resistor 54 when transistors 51 and 52 are at cutoff. When these transistors are forward biased to conduction, however, the base of transistor 56 is connected to the negative terminal of the power source. This causes transistor 56 to conduct heavily, thereby supplying current to motors 42 and 43.

Transistors 51 and 52 will thus become conductive when there are no light signals impinging on the sensitive surfaces of either photoconductive cells 19 or 20 and transistors 44 and 47 are cut off. Under such conditions, a positive signal will be fed from the B plus terminal through resistor 57, diode 53 and resistor 58 to the base of transistor 51. A similar positive signal will be fed through resistor 59, diode 60, and resistor 61 to the base of transistor 52. These two transistors will therefore be forward biased to conduction and a negative signal will be provided through them to drive transistor 56 to conduction. "And" gate 40 thus effectively gates through a signal to the reverse motors only when no light signals are being received by either of the photoconductive cells.

While the invention has been described in connection with its use as a toy, it may be constructed for other purposes and of different sizes, as desired. The foregoing detailed description is to be clearly understood as given by way of illustration and example only, the spirit and scope of this invention being limited solely by the appended claims.

I claim:

1. A vehicle for following a path defined by light and dark areas comprising a body, a left and a right-hand propulsion means for causing said body to move forwardly, a first photosensitive means carried by said body and positioned to receive light at the left-hand portion of said body, said first photosensitive means being operatively connected to said right-hand propulsion means for controlling the same at a rate varying directly with the intensity of light received by said first photosensitive means, and a second photosensitive means carried by said body and positioned to receive light at the right-hand portion of said body, said second photosensitive means being operatively connected to said left-hand propulsion means for controlling said left-hand propulsion means at a rate varying directly with the intensity of light received by said second photosensitive means.

2. A device as recited in claim 1 including in addition a reverse propulsion means for causing said body to move rearwardly, said reverse propulsion means being operative only when both said first and second photosensitive means receive substantially minor amounts of light.

3. A vehicle comprising a body, a first propulsion means having a ground engaging portion at the left-hand portion of said body, a second propulsion means having a ground engaging portion at the right-hand portion of said body, a first photosensitive means for controlling the operation of said first propulsion means, said first photosensitive means being positioned at the right-hand portion of said body for receiving light reflected from the surface beneath said right-hand portion, a second photosensitive means for controlling said second propulsion means, said second photosensitive means being positioned at the left-hand portion of said body for receiving light reflected from the surface beneath said left-hand portion of said body, each of said photosensitive means including means for operating the propulsion means controlled thereby at a rate increasing with the amount of light received by said photosensitive means, and for stopping the propulsion means controlled thereby when a minor intensity of light is received by said photosensitive means.

4. A device as recited in claim 3 including in addition a source of light carried by said body and arranged to strike the surface beneath said body at said left and right portions.

5. A vehicle comprising a body, a first drive motor, a first propelling means connected to said first drive motor for operation thereby, said first propelling means being disposed on the left-hand portion of said body, a second drive motor, a second propelling means connected to said second drive motor for operation thereby, said second propelling means being disposed on the right-hand portion of said body, a first electrical circuit means for operating said first drive motor, said first electrical circuit means including a photoconductor carried by said body at the forward right-hand portion thereof positioned for receiving light reflected from beneath said body at said forward right-hand portion, and a second electrical circuit means for operating said second drive motor, said second electrical circuit means including a second photoconductor disposed at the forward left-hand portion of said body positioned to receive light reflected surface beneath said forward left-hand portion of said body, each of said photoconductors offering resistance in the circuits thereof proportional to the intensity of light received thereby for controlling the speed of its motor in such proportion.

6. A vehicle comprising a body; a left-hand propulsion means for said body disposed laterally to the left of the center line thereof and adapted to engage the surface beneath said body for propelling the left-hand portion of said body; a right-hand propulsion means disposed laterally to the right of the center line of said body and adapted to engage the surface beneath said body for propelling the right-hand portion of said body; a first drive motor connected to said left-hand propulsion means; a second drive motor connected to said right-hand propulsion means, a first electrical circuit means for said first drive motor, said first circuit means including a first photoconductive cell positioned at the lower forward right-hand portion of said vehicle for receiving light reflected from the surface beneath said forward right-hand portion, and an amplifier for amplifying a signal received from said first photoconductive cell; and a second electrical circuit means for said second drive motor, said second circuit means including a second photoconductive cell positioned at the lower forward left-hand portion of said vehicle for receiving light reflected from the surface beneath said forward left-hand portion of said vehicle, and an amplifier connected to said second photoconductive cell for amplifying a signal received therefrom, each of said photoconductive cells offering a resistance in the circuit thereof proportional to the amount of light received by said photoconductive cell for controlling the speed of its motor in such proportion.

7. A device as recited in claim 6 including in addition a source of light carried by said body and positioned between said photoconductive cells for directing light to the surface beneath said vehicle at said forward left- and right-hand portions thereof.

8. A device as recited in claim 7 in which said source of light includes reflector means for directing said light to said left and right-hand portions, and baffle means for preventing said light from striking intermediate portions, said photoconductive cells being spaced inwardly from the forward end of said vehicle for preventing substantial amounts of light other than from said source of light from being reflected to said photoconductive cells.

9. In a device for controlling the motion of a motor driven vehicle, said vehicle having left- and right-hand forward motive means and reverse motive means, first and second drive means for providing drive signals to said left- and right-hand forward motive means respectively, and left- and right-hand photoconductive means for providing control signals to said first and second drive means, said left-hand photoconductive means being operatively connected to said second drive means, and said right-hand photoconductive means being operatively connected to said drive means, and means operatively connected to said first and second drive means for providing drive signals to said reverse motive means when there are no output signals from said left- and right-hand photoconductive means, each of said photoconductive means including means for varying the control signal thereof in accordance with the amount of light received thereby for controlling the rate of said drive means in accordance with said amount of light.

10. A control device for a vehicle comprising, right-hand motor means for driving said vehicle, left-hand motor means for driving said vehicle, right- and left-hand amplifier means operatively connected to said right- and left-hand motor means respectively, photoconductor means for providing an input signal to each of said amplifier means, said photoconductor means being mounted on opposite sides of said vehicle, the photoconductive means on the left-hand side of the vehicle being operatively connected to said right-hand amplifier means, and the photoconductive means on the right-hand side of said vehicle being operatively connected to said left-hand amplifier means, reverse motor means for driving said vehicle, reverse amplifier means operatively connected to said reverse motor means, and gate means operatively connected to said right- and left-hand amplifier means for permitting said reverse amplifier means to conduct only when there is no output signal from said right- and left-hand amplifier means.

11. In a tracking vehicle, motor means for driving said vehicle in a forward direction, said motor means including a first portion for driving the left-hand side of said vehicle, and a second portion for driving the right-hand side of said vehicle, means for driving said vehicle in a reverse direction, first and second photoconductive means mounted on opposite sides of said vehicle for detecting light signals, said first photoconductive means being mounted on the left-hand side of said vehicle, and said second photoconductive means being mounted on the right-hand side of said vehicle, first and second amplifier means for respectively amplifying the outputs of said first and second photoconductive means, a power source, said first and second amplifier means being operatively connected between said power source and said second and first portions, respectively, of said forward drive means, an "And" gate responsively connected to said first and second amplifiers, said "And" gate being actuated when there is no output signal from said first and second amplifiers, and third amplifier means operatively connected to receive the output of said "And" gate, said third amplifier means being interposed between said power source and said reverse driving motor means.

12. A device for controlling the motion of a motor driven vehicle, said vehicle having left- and right-hand forward motive means and reverse motive means, said device comprising first and second drive means for providing drive signals to said left- and right-hand forward motive means respectively, and left- and right-hand photoconductive means for providing control signals to said first and second drive means, said left-hand photoconductive means being operatively connected to said second drive means, and said right-hand photoconductive means being operatively connected to said first drive means, and means operatively connected to said first and second drive means for providing drive signals to said reverse motive means when there are no output signals from said left- and right-hand photoconductive means, said means for providing drive signals to said reverse motive means including an "And" gate connected to said drive means for said left- and right-hand forward motive means, said "And" gate being actuated when there are no drive signals to both said left- and right-hand forward motive means, an amplifier operatively connected to said reverse motive means, and a power source connected to said amplifier, the output of said "And" gate being connected to said amplifier.

References Cited in the file of this patent

UNITED STATES PATENTS

| | | |
|---|---|---|
| 2,331,144 | Sitter | Oct. 5, 1943 |
| 2,424,288 | Severy | July 22, 1947 |
| 2,832,426 | Seargeant | Apr. 29, 1961 |
| 2,996,621 | Barrett | Aug. 15, 1961 |